US010150075B2

(12) United States Patent
Marks et al.

(10) Patent No.: US 10,150,075 B2
(45) Date of Patent: Dec. 11, 2018

(54) PIN FILTER

(71) Applicant: Parker-Hannifin Corporation, Cleveland, OH (US)

(72) Inventors: Evan Marks, Toledo, OH (US); Kevin Noe, Metamora, OH (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 42 days.

(21) Appl. No.: 15/076,707

(22) Filed: Mar. 22, 2016

(65) Prior Publication Data

US 2016/0332103 A1 Nov. 17, 2016

Related U.S. Application Data

(60) Provisional application No. 62/161,320, filed on May 14, 2015.

(51) Int. Cl.
| | |
|---|---|
| *B01D 35/30* | (2006.01) |
| *B01D 46/00* | (2006.01) |
| *B01D 35/31* | (2006.01) |
| *B01D 46/24* | (2006.01) |
| *B01D 46/42* | (2006.01) |

(Continued)

(52) U.S. Cl.
CPC ........... *B01D 46/008* (2013.01); *B01D 29/15* (2013.01); *B01D 29/96* (2013.01); *B01D 35/30* (2013.01); *B01D 35/31* (2013.01); *B01D 46/0004* (2013.01); *B01D 46/0005* (2013.01); *B01D 46/2411* (2013.01); *B01D 46/4227* (2013.01); *B01D 27/08* (2013.01); *B01D 2201/24* (2013.01); *B01D 2201/295* (2013.01); *B01D 2201/306* (2013.01); *B01D 2201/347* (2013.01); *B01D 2201/4053* (2013.01); *B01D 2265/026* (2013.01); *B01D 2265/05* (2013.01)

(58) Field of Classification Search
USPC ........................................................ 210/232
See application file for complete search history.

(56) References Cited

U.S. PATENT DOCUMENTS

| | | | | |
|---|---|---|---|---|
| 2,991,885 A | * | 7/1961 | Gutkowski | ............ B01D 35/12 210/133 |
| 3,322,280 A | | 5/1967 | Taylor | |

(Continued)

FOREIGN PATENT DOCUMENTS

| | | |
|---|---|---|
| EP | 2 155 355 B1 | 4/2008 |
| JP | 56-010306 A * | 2/1981 |

OTHER PUBLICATIONS

Parker Hannifin Corporation, Pressure Vessels, Threadless Pin Closure Pressure Vessel, Nov. 2012.

*Primary Examiner* — Thomas M Lithgow
(74) *Attorney, Agent, or Firm* — Renner, Otto, Boisselle & Sklar, LLP

(57) ABSTRACT

The filter assembly includes a threadless closure system for sealing a filter element of the filter assembly within a bowl of the filter assembly. The bowl is fluidly connectable to opposing fluid transfer passages. The filter element and a cover element connected to the filter element are received into the bowl. The filter element is retained in the bowl via a pin of the filter assembly that engages the cover element. The filter element may be removed and replaced without the unscrewing of threads exposed to an external environment external to the filter assembly during typical use of the filter assembly.

19 Claims, 15 Drawing Sheets

(51) Int. Cl.
   *B01D 29/15*   (2006.01)
   *B01D 29/96*   (2006.01)
   *B01D 27/08*   (2006.01)

(56) References Cited

U.S. PATENT DOCUMENTS

| | | | | |
|---|---|---|---|---|
| 3,850,813 | A * | 11/1974 | Pall | B01D 29/111 |
| | | | | 210/232 |
| 4,139,468 | A * | 2/1979 | Rosaen | B01D 29/232 |
| | | | | 210/130 |
| 4,985,142 | A * | 1/1991 | Laycock | B01D 35/147 |
| | | | | 210/130 |
| 5,487,828 | A * | 1/1996 | Goet | B01D 29/117 |
| | | | | 210/435 |
| 5,653,870 | A | 8/1997 | Tsuchiya et al. | |
| 7,494,017 | B2 | 2/2009 | Miller | |
| 2005/0121401 | A1 * | 6/2005 | Walton | B01D 29/15 |
| | | | | 210/791 |
| 2006/0186031 | A1 | 8/2006 | Fick et al. | |
| 2011/0132816 | A1 | 6/2011 | Vasilescu | |
| 2012/0031828 | A1 | 2/2012 | van Savooijen et al. | |
| 2012/0181224 | A1 * | 7/2012 | Rapin | B01D 35/153 |
| | | | | 210/232 |

\* cited by examiner

PIN FILTER

This application claims the priority of U.S. Provisional Application No. 62/161,320, filed on May 14, 2015, which is hereby incorporated by reference in its entirety.

FIELD OF INVENTION

The present invention relates generally to fluid filters and, more particularly, to filters used in oil or gas distribution systems.

BACKGROUND

Filter assemblies have been employed in a variety of applications including hydraulic systems, fuel systems and engine lubrication systems. Such assemblies heretofore have used replaceable filter elements that can be installed on a filter head for filtering fluid flowing between inlet and outlet passages in the filter head. The filter element typically is contained within a housing such as a can that can be screwed onto or off of the filter head. In a so-called spin-on filter, the can is discarded along with the filter element. In other arrangements, only the filter element is replaced and the housing is reused.

During use the filter element may become clogged to the point that is causes a problem in the system, such as inadequate flow to components downstream of the filter, excessive pressure upstream of the filter element, and/or damage to the filter element allowing the accumulated contaminants to flow to components downstream of the filter element. Replacement of the filter requires the entire housing and filter element to be removed. Such replacement can be extremely difficult when the closure, such as a threaded closure, has suffered corrosion or galling due to repeated removal/reattachment or due to the environment of use. For example, filter assemblies used in oil drilling applications are often subjected to air and moisture heavy with salts, causing corrosion of the filter assembly components. In these situations, great force and time can be necessary simply to remove the housing, or in a worse case, the housing and associated bowl coupling, such as threading, may become irreparably damaged in the removal process requiring replacement of the entire filter assembly including the bowl and housing.

SUMMARY OF INVENTION

The present invention provides a filter assembly that includes a threadless closure system for sealing a filter element of the filter assembly within a bowl of the filter assembly. Generally, the bowl of the filter assembly is fluidly connectable to external structure for providing fluid connection to opposing fluid transfer passages. The filter element and a cover element connected to the filter element are received into the bowl. The filter element is retained in the bowl via a pin of the filter assembly that engages the cover element.

The filter element is easier to remove and replace than in conventional filter assemblies. The filter element can be removed and replaced without the unscrewing of threads that are exposed to an external environment during typical use of the filter assembly. Accordingly, the filter assembly is particularly suitable for applications in corrosive environments, such as near an ocean where air carrying increased salt can cause galling of corresponding threads of threaded components.

According to one aspect of the invention, there is a filter assembly for fluid connection to opposed fluid transfer passages. The filter assembly includes a bowl configured for fluid connection with the opposed fluid transfer passages and has a flow path defined therein for flow of fluid through the filter assembly between the opposed fluid transfer passages. The filter assembly also includes a filter element, a cover element insertable into the bowl and connected to the filter element, the cover element and filter element being jointly removably received into the bowl to further define a portion of the flow path, and a pin removably inserted into the bowl and into the cover element to secure the cover element in the bowl, the pin being separated from flow through the filter assembly through the flow path within the bowl.

The filter assembly may further include a seal element disposed between the bowl and the cover element, which separates the pin from flow through the filter assembly.

The flow path through the filter assembly may be defined between an inlet port and an outlet port of the bowl, and include a cover passage extending through the cover element and a filter passage through the filter element disposed therebetween, the filter passage being disposed between the inlet port and the cover passage along the flow path.

The bowl may include an inlet port fluidly connectable to one of the opposed fluid transfer passages and an outlet port fluidly connectable to the other of the opposed fluid transfer passages, and may further a seal element disposed between the bowl and the cover element that within the bowl fluidly separates the inlet port from the outlet port, preventing fluid communication within the bowl between the inlet port and outlet port.

The filter assembly may further include another seal element disposed between the bowl and the cover element that separates the pin from the flow path through the filter assembly.

The seal element may circumscribe the cover element and include a central plane that separates the seal element into two complete annular halves, the central plane set at an oblique angle to a longitudinal axis extending through the cover element, wherein the cover element is movable along the longitudinal axis to be received into and removed from the bowl.

The pin may have a central longitudinal pin axis and the cover element has a central longitudinal cover axis, wherein the pin axis and the cover axis orthogonally intersect one another.

The filter may include a retaining gasket received into and retained by the retaining end of the cover element such that the cover element and filter element are jointly translatable relative to the bowl.

The filter assembly may further include an adapter coupled between the filter and the cover element.

The filter may include a retaining gasket received into and retained by the adapter such that the cover element, adapter and filter element are jointly translatable relative to the bowl.

According to another aspect, there is a filter assembly that includes a bowl having a bowl body that defines a bowl cavity, the bowl cavity extending along a longitudinal cavity axis, and the bowl further having an inlet port and an outlet port extending through the bowl body into the bowl cavity. The filter assembly also includes a filter element and a cover element. The cover element has a retaining feature at one end that retains the filter element relative to the cover element and a cover passage extending through the cover element. The cover element and filter element each are received into the bowl cavity along the longitudinal cavity axis, wherein the inlet and outlet ports are in fluid communication in the filter assembly via the cover passage. The filter element is disposed in a flow path through the filter assembly from the inlet port to the outlet port, the filter element being disposed in the flow path between the inlet port and the cover passage. The filter assembly further includes a pin that engages the cover element through a cover pin cavity of the cover element and through a bowl pin hole of the bowl to retain the filter element in the bowl cavity.

The filter assembly may further include an annular seal disposed about the cover element and between the cover element and the bowl body, wherein the annular seal separates the pin from the flow path through the filter assembly.

The filter assembly may further include an annular seal disposed about the cover element and between the cover element and the bowl body, wherein the inlet and outlet port are fluidly separated from one another within the portion of the bowl cavity disposed about the cover element via the annular seal.

The annular seal may circumscribe the longitudinal cavity axis and include a central plane set at an oblique angle to the longitudinal cavity axis.

The filter assembly may further include an annular first seal circumscribed about the cover element that fluidly separates the pin from the flow path through the filter assembly, and a second annular seal circumscribed about the cover element that fluidly separates a portion of the bowl cavity disposed about the cover element into two portions thus separating fluid communication between the inlet port and the outlet port through this portion.

The cover pin cavity and bowl pin hole may align along a pin hole axis that intersects the longitudinal cavity axis.

The longitudinal cavity axis and the pin hole axis may be orthogonally offset from one another.

The pin may include a pin handle at an end opposing another end of the pin that is received into the bowl cavity.

The bowl pin hole may be spaced circumferentially from the inlet port and the outlet port about the bowl body.

According to yet another aspect, there is a method of replacing a filter element in a filter assembly having a bowl attached between opposing fluid transfer passages, a filter element and cover element received into the bowl, and pin inserted into the bowl and engaging the cover element to retain the cover element and filter element in the bowl. The method includes the steps of disengaging the pin from the cover element, removing the cover element from the bowl, and disconnecting the filter element relative to the cover element.

The method may further include the steps of aligning an alignment portion of the cover element with a corresponding alignment portion of the bowl prior to re-inserting the cover element into the bowl, and then re-inserting the cover element into the bowl.

The method may further include the step of re-engaging the pin with the cover element after re-inserting the cover element into the bowl.

The removing the pin from the cover element may include linearly translating the pin relative to the cover element, and removing the cover element from the bowl may include linearly translating the cover element relative to the bowl.

According to still another aspect, a filter assembly includes a bowl having a bowl body that defines a bowl cavity, the bowl cavity extending along a longitudinal cavity axis, and the bowl further having an inlet port and an outlet port extending through the bowl body into the bowl cavity. The filter assembly also includes a cover element having a retaining feature at a retaining end for retaining a filter element therewith, the cover element being received into the bowl cavity along the longitudinal cavity axis, and having a cover passage extending through the cover element to an outlet portion of the cover element. Further included is a pin that engages the cover element through a cover pin cavity of the cover element and through a bowl pin hole of the bowl to retain the cover element in the bowl cavity, and a seal element disposed about the cover element when the cover element is received in the bowl cavity. One of the inlet portion or the outlet portion of the cover element is separated from the retaining end of the cover element in the bowl cavity and the inlet and outlet ports of the bowl are separated from one another in the bowl cavity by the seal element when the cover element is received into the bowl.

The seal element may be a resilient member disposed about the cover element and retained in a groove of the cover element.

The seal element may circumscribe the cover element and include a central plane that is set at an oblique angle to the longitudinal cavity axis.

The filter assembly may further include another seal element disposed between the bowl and the cover element that separates the pin from a flow path through the filter assembly.

A filter for use with the filter assembly may include a retaining gasket received into and retained by the retaining end of the cover element such that the cover element and filter element are jointly translatable relative to the bowl.

The foregoing and other features of the invention are hereinafter described in greater detail with reference to the accompanying drawings.

DETAILED DESCRIPTION

The principles of the present disclosure have particular application to oil and gas fluid transfer systems, such as in fluid transfer systems of oil drilling rigs. As used herein, the term "fluid" refers to liquid, gas, or any combination thereof. Of course, the principles of the present disclosure may also be useful in applications other than oil and gas applications, such as in other fluid transfer operations, such as for moving water, alcohol, oxygen, etc. For example, the filter assembly of the present disclosure may be suitable in operations where galling of threaded components leads to difficulty in performing maintenance activities on filter assemblies including threaded components having threads exposed to the external environment.

Figure 1:
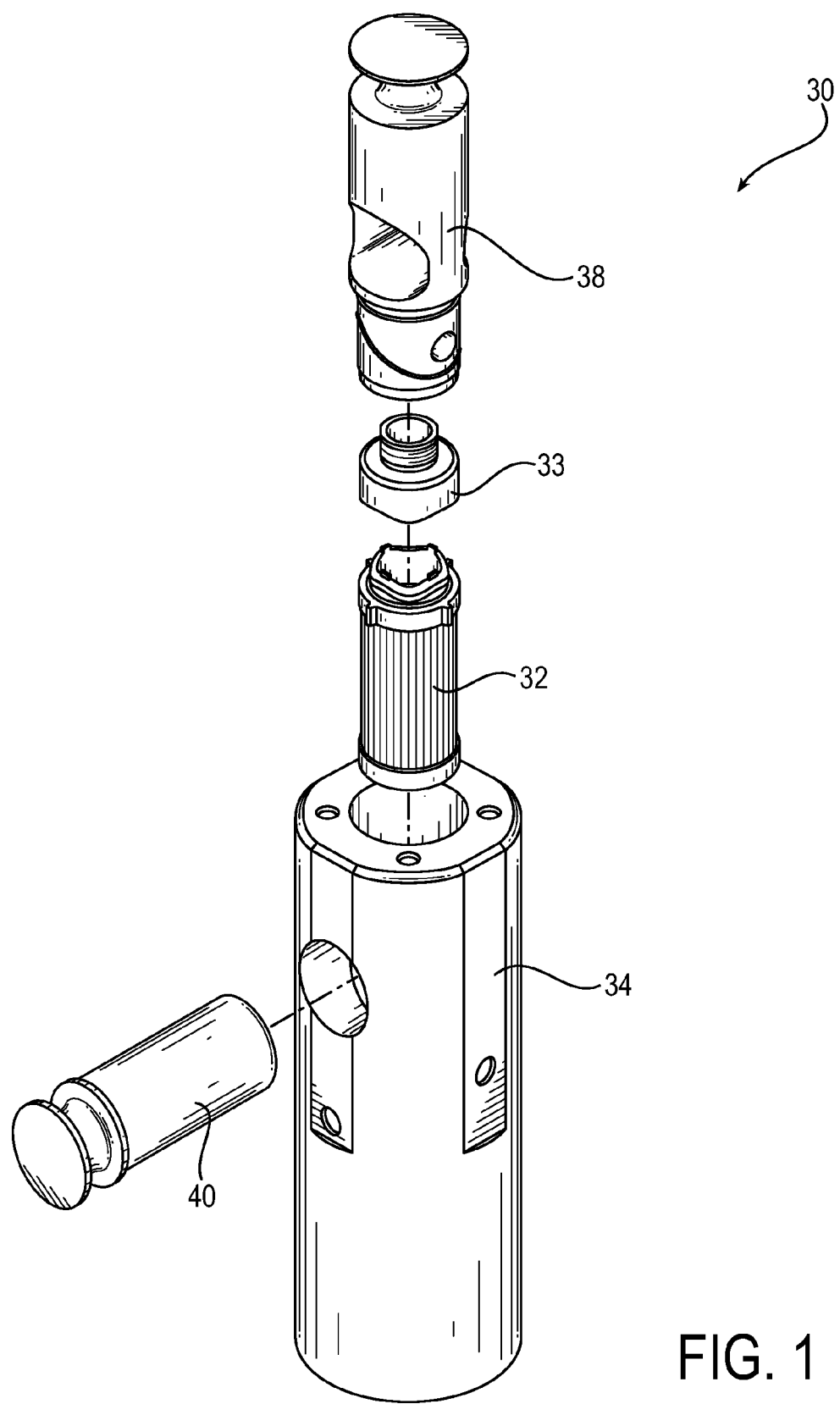
FIG. 1 is an exploded orthogonal view of an exemplary filter assembly.

Turning now to FIG. 1, an exemplary filter assembly 30 is depicted in an exploded view. The filter assembly 30 is configured to be fluidly connected in a fluid transfer system between opposing fluid transfer passages and includes a filter element 32 for filtering the fluid passing through the filter assembly 30. Also included in the filter assembly 30 are a adapter 33, a bowl 34, cover element 38, and securing pin 40.

Figure 2:
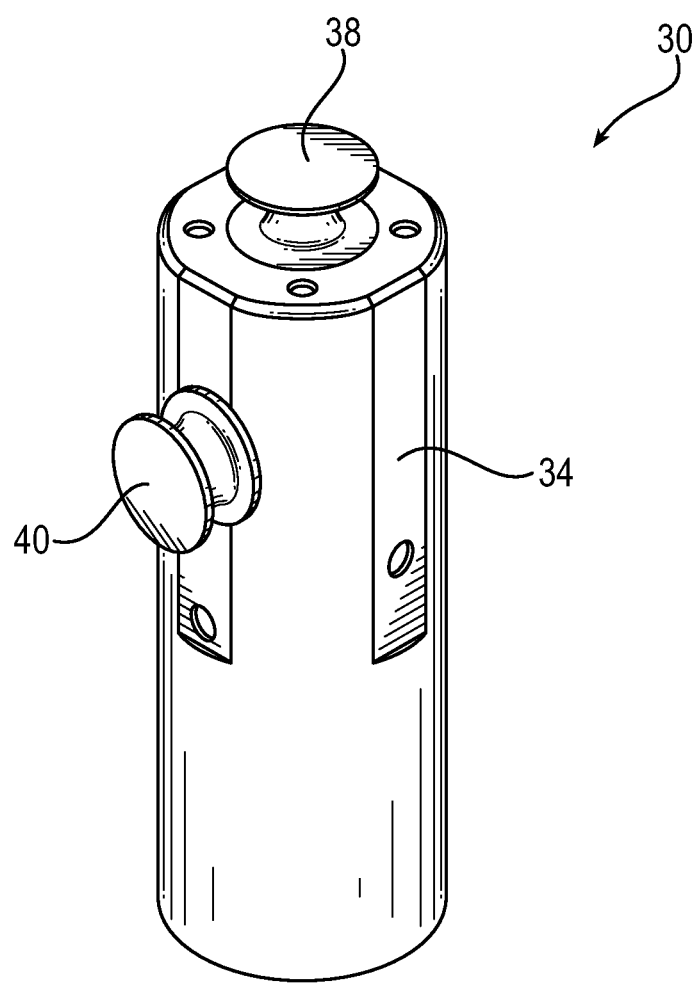
FIG. 2 is an orthogonal view of the filter assembly of FIG. 1.

As shown in FIG. 2 and described below in greater detail, the connected filter element 32 and cover element 38 are generally removably received into the bowl 34, and are secured within the bowl via selectively removable insertion of the securing pin 40 relative to the cover element 38. The adapter 33 is a coupling provided to couple the filter element 32 to the cover element 38, though the adapter 33 may be integral with either of the filter element 32 or cover element 38 in other embodiments.

In the depicted embodiment, the filter element 32 may be removed and replaced without the unscrewing of threaded components having threads exposed to an external environment during use of the filter assembly 30. Thus threads that are not fully sealed in the bowl cavity 44 during typical use of the filter assembly 30 are preferably omitted from the filter assembly 30. As used herein, an external environment includes the environment external to the filter assembly 30 and disposed about the assembled filter assembly 30. The aforesaid construction of the filter assembly 30 makes it easy to remove and replace the filter element 32, as will be described below in detail.

Figure 3:
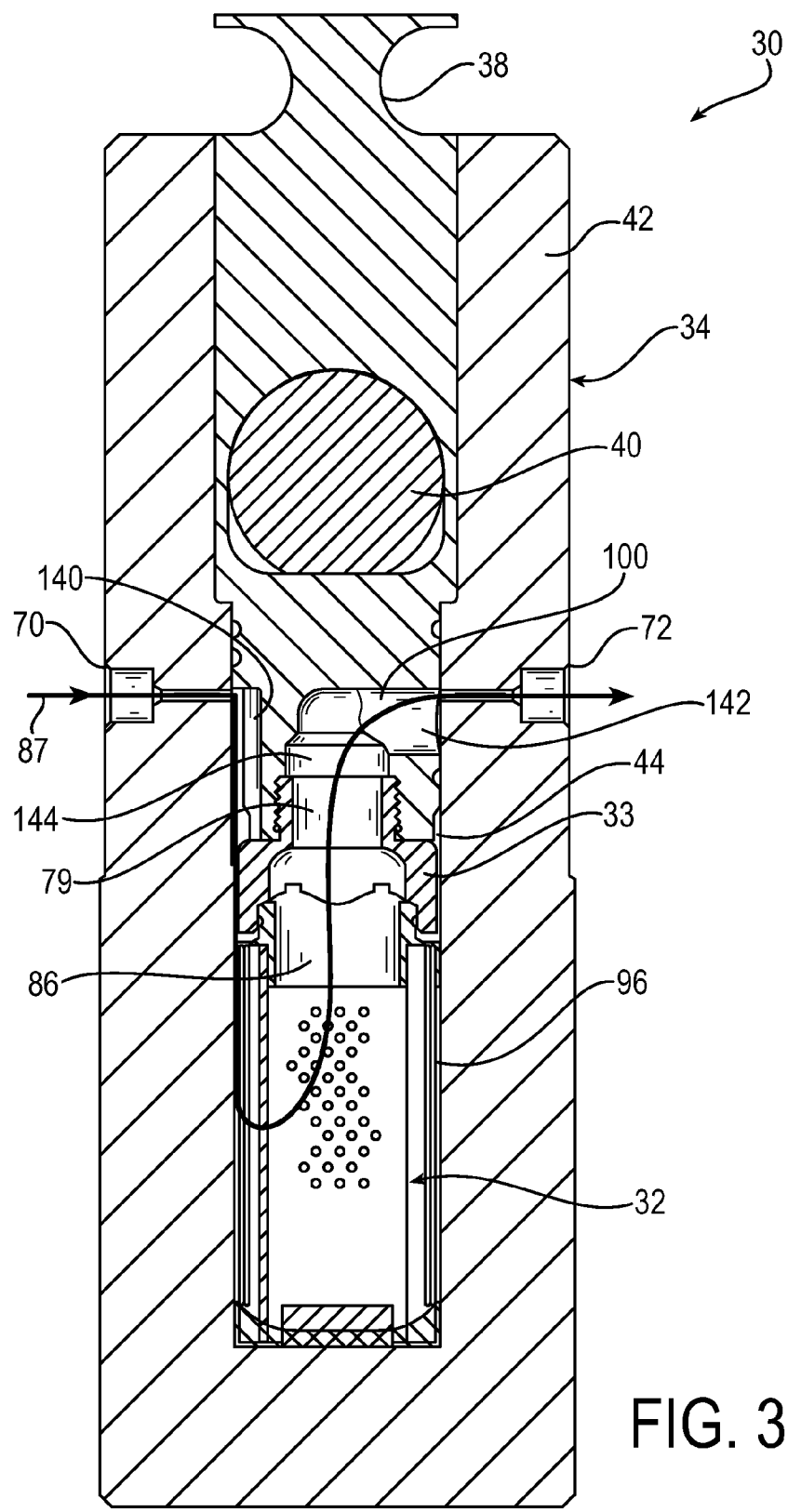
FIG. 3 is a partial cross-section view of the filter assembly of FIG. 1.
Figure 4:
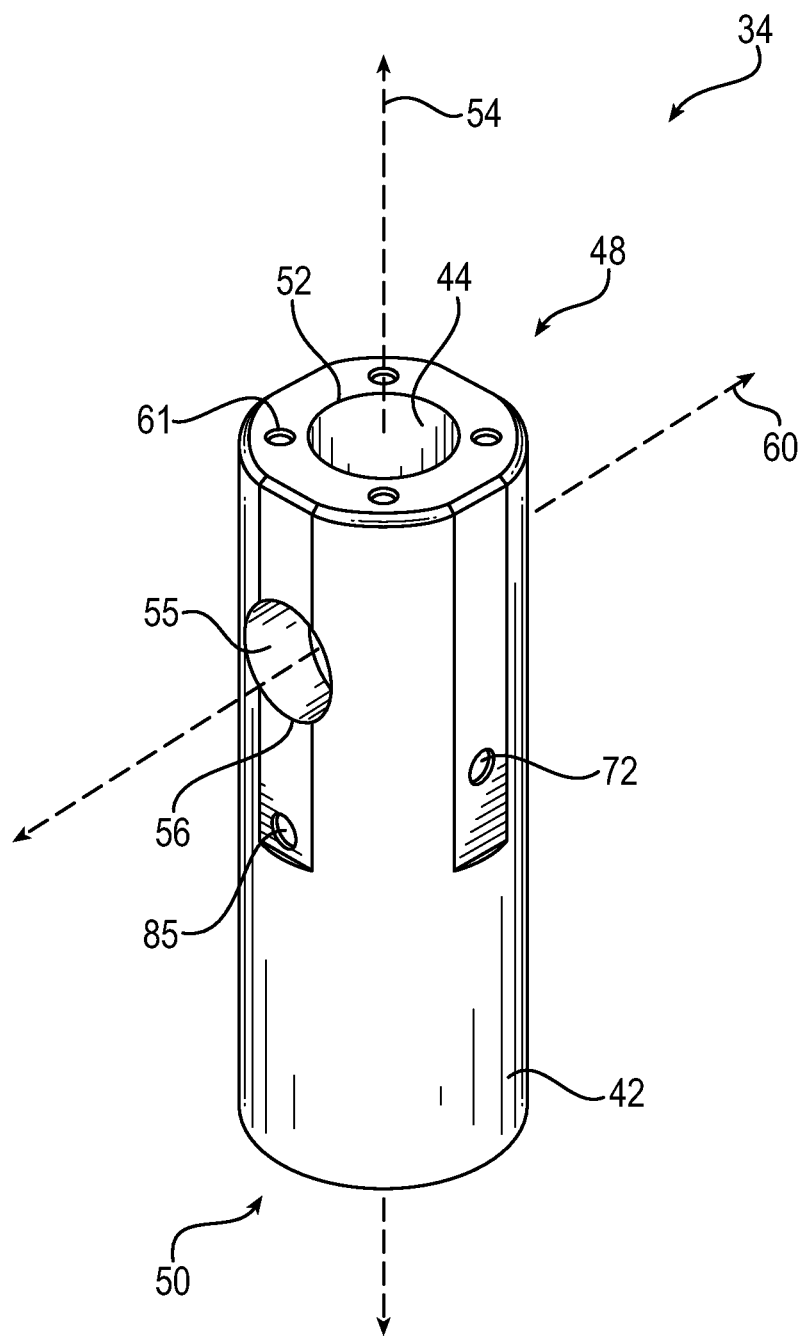
FIG. 4 is an orthogonal view of a bowl of the filter assembly of FIG. 1.
Figure 5:
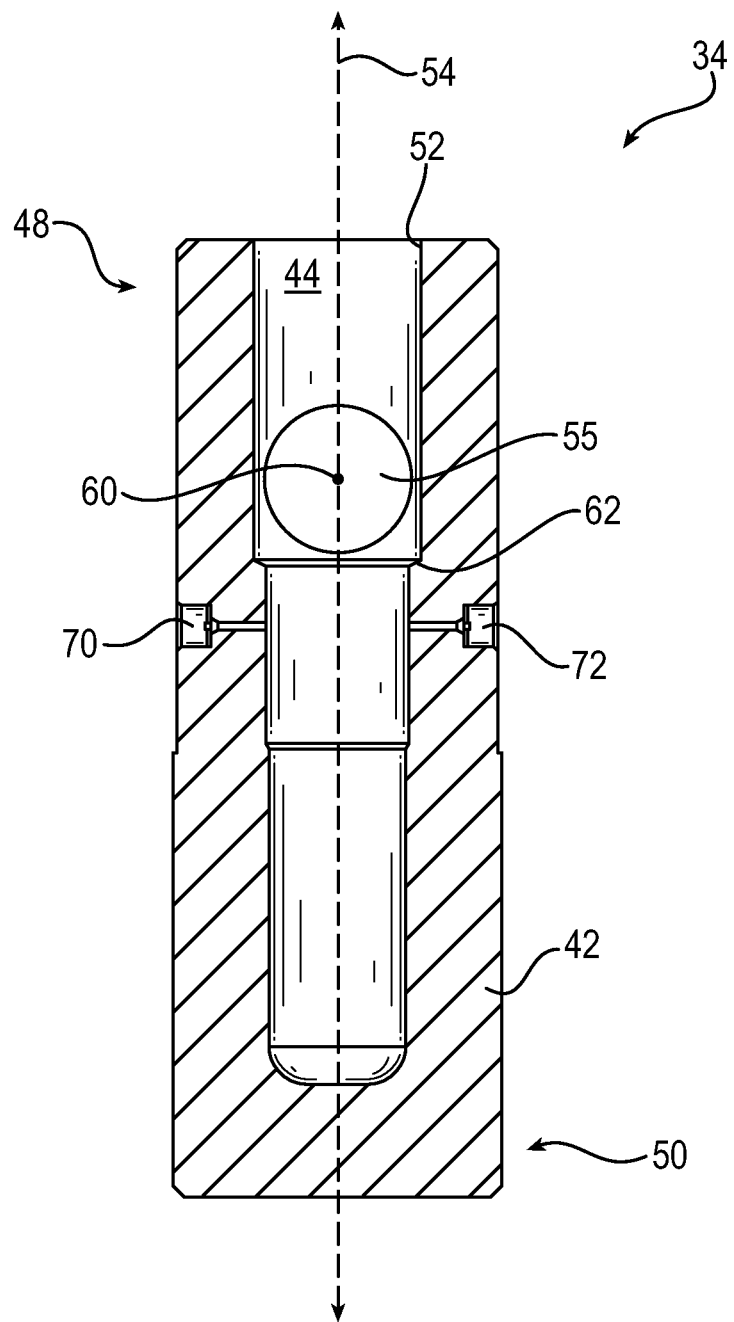
FIG. 5 is a cross-section side view of the bowl of FIG. 4.
Figure 6:
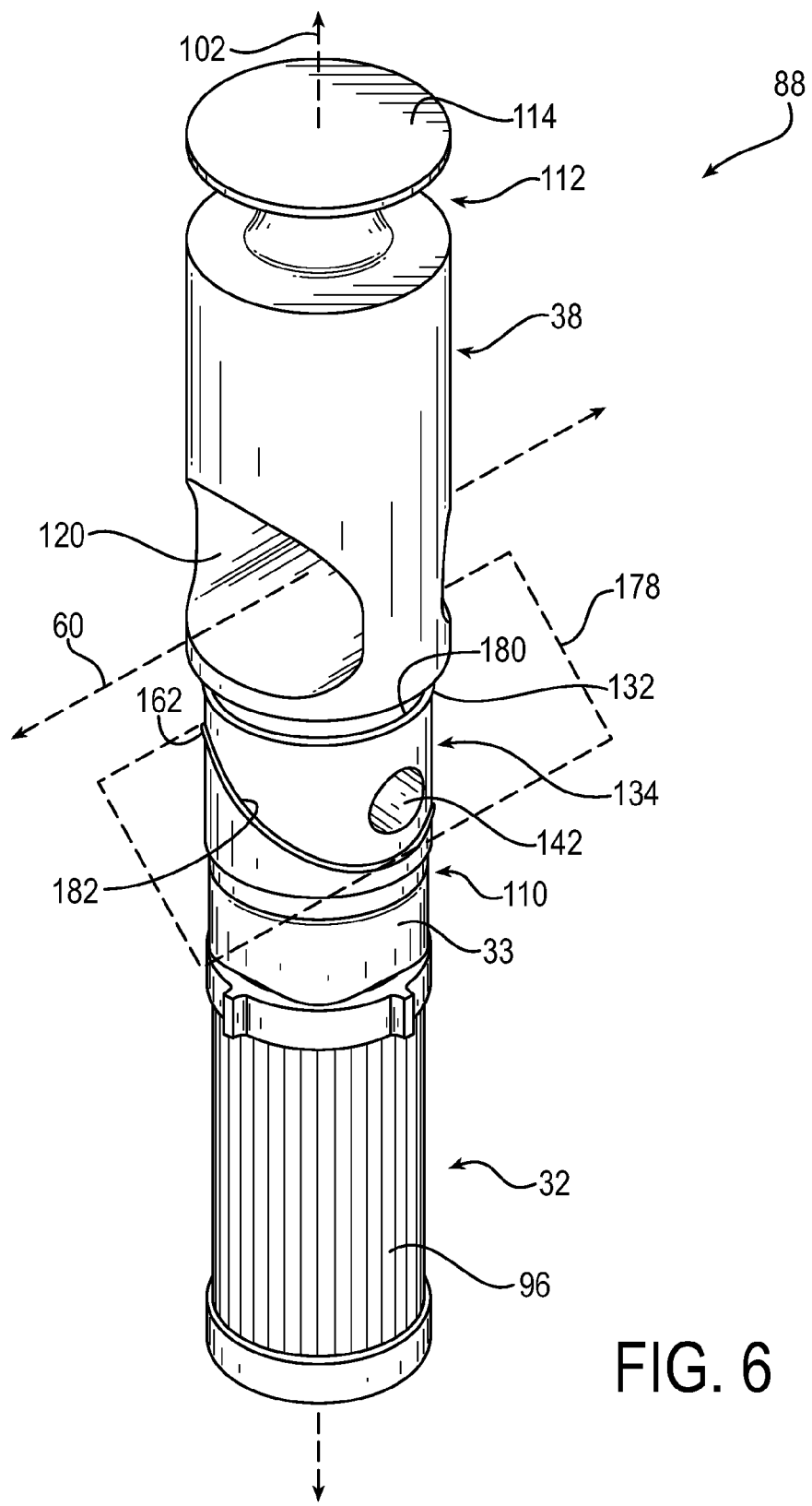
FIG. 6 is an orthogonal view of a cover element, adapter and filter element of FIG. 1

Referring to FIGS. 3 to 5, the exemplary bowl 34 is depicted separate from a remainder of the filter assembly 30. The bowl 34 is configured for fluid connection with opposed fluid transfer passages having one line for passing fluid into the filter assembly 30 and another line for receiving filtered fluid exiting the filter assembly 30. The bowl 34 has a bowl body 42 defining a bowl cavity 44 extending therein. The bowl body 42 is shown as generally cylindrical in shape with the bowl cavity 44 also being cylindrical in shape and disposed concentrically relative to the cylindrical shape of the bowl body 42.

In some embodiments the bowl body 42 and/or bowl cavity 44 may be of any other suitable shape. In some embodiments the bowl cavity 44 may not be disposed concentrically relative to the cylindrical shape of the bowl body 42.

The thickness of the bowl body 42 is configured to withstand pressure of fluid moving through the bowl cavity 44. Any suitable thickness may be used and/or the thickness may or may not be uniform about the bowl cavity 44.

The bowl cavity 44 extends between opposing ends 48 and 50 of the bowl body 42 along a longitudinal bowl cavity axis 54. In the depicted embodiment, the longitudinal bowl cavity axis 54 is the central longitudinal axis of both the bowl body 42 and the bowl cavity 44. The bowl cavity 44 opens to a receiving end 48 of the opposing ends 48 or 50, and thus the bowl 34 is open at one end 48 and generally closed at the other end 50. The receiving end 48 has a receiving opening 52 for receiving into the bowl cavity 44 the filter element 32, the adapter 33, and the associated cover element 38.

A bowl pin hole 55 extends between a pin opening 56 and the bowl cavity 44 for receiving the securing pin 40. The bowl pin hole 55 extends along a pin hole axis 60 through the bowl body 42 between the bowl cavity 44 and an external surface of the bowl 34 disposed between the opposing ends 48 and 50. Though in other embodiments, the bowl pin hole 55 may open to any suitable external surface of the bowl 34. As shown, the bowl pin hole 55 does not extend fully diametrically through the bowl 34, though in other embodiments the bowl pin hole 55 may extend fully through the bowl 34 between opposed sides of the bowl 34.

The pin hole axis 60 and the bowl cavity axis 54 are shown as intersecting axes disposed orthogonal to one another. In other embodiments, the two axes 54 and 60 may be disposed at a non-orthogonal angle relative to one another, and/or the axes 54 and 60 of the bowl 34 may not intersect one another.

As shown, the receiving end 48 of the bowl 34 includes a plurality of mounting holes 61 for receiving suitable fasteners to enable mounting of the filter assembly 30 relative to an associated fluid transfer system or other corresponding structure. Securing of the bowl 34 provides for preventing unintended movement of the bowl 34, and of the filter assembly 30, relative to the associated fluid transfer system.

Four mounting holes 61 are shown and are threaded for receiving correspondingly threaded fasteners, such as bolts, although any number of mounting holes 61 may be included. Further, alternative or additional mounting holes may be included in any external surface of the bowl body 42, for securing the filter assembly 30 relative to the fluid transfer system. In even further embodiments, the mounting holes 61 may be omitted and any other suitable method of securing the filter assembly 30 relative to the transfer system may be used, such as welding, channel and groove mounting, etc.

Still referring to the bowl 34, the bowl body 42 further defines a positive step, such as a shoulder seat 62, for engaging a portion of the cover element 38 being received into the bowl cavity 44. Accordingly the bowl cavity 44 is at least partially defined by the shoulder seat 62. The shoulder seat 62 is disposed along the longitudinal axis 54 between the bowl pin hole 55 and the other end 50. Thus, upon insertion of the cover element 38 into the bowl cavity 44 and engagement of the securing pin 40 with the bowl 34 and the cover element 38, the cover element 38 is secured along the longitudinal axis 54 between the securing pin 40 and the shoulder seat 62 of the bowl 34.

The bowl 34 further includes an inlet port 70 and an outlet port 72 each extending through the bowl body 42 into the bowl cavity 44, such as disposed farther from the receiving opening 52 along the longitudinal axis 54 than the shoulder seat 62. The inlet port 70 is fluidly connectable to one of the opposed fluid transfer passages for delivering unfiltered fluid to the filter assembly 30. The outlet port 72 is fluidly connectable to the other of the opposed fluid transfer passages for delivering filtered fluid from the filter assembly 30.

While the ports 70 and 72 are shown as disposed along the longitudinal axis 54 between the ends 48 and 50 of the bowl 34, one or more of the ports 70 and 72 may be disposed at one of the ends 48 and 50 in other embodiments. Further, one or both of the ports 70 and 72 may include threads for connecting to an associated fluid transfer assembly. Other methods of attachment may also be suitable, such as welding, tolerance fit, etc.

As depicted, the inlet port 70 and outlet port 72 are oppositely disposed, such as diametrically opposed, about the longitudinal bowl cavity axis 54. In some embodiments the inlet port 70 and outlet port 72 may be more closely circumferentially spaced relative to one another about the longitudinal axis 54. Each of the inlet port 70 and outlet port 72 are also circumferentially spaced about the longitudinal axis 54 from the pin opening 56, such as being equally circumferentially spaced relative to one another and the pin opening 56, thus allowing for clearance for easy removal and insertion of the securing pin 40 into the bowl pin hole 55.

Additionally, the bowl 34 may include one or more suitable vents, such as a vent 85 extending through the bowl body 42 from an external surface of the bowl 34 to the bowl cavity 44. During use of the filter assembly 30, a vent plug (not shown) coupled to the bowl 34 in the vent 85 may be at least partially loosened, such as rotatably, relative to the vent 85 and the bowl body 42. Thus pressure and/or fluid inside the bowl cavity 44 may be relieved through the vent 85 to the external environment prior to removing the securing pin 40 and the cover 38 from the bowl 34.

The vent 85 is configured, such as being threaded, to receive the vent plug to seal the bowl cavity 44 through the vent 85 from the external environment. Alternatively, the vent 85 may include any other suitable feature for enabling coupling of an associated vent plug to the bowl body 42. Further, the vent 85 is depicted as disposed longitudinally intermediately between the opposing ends 48 and 50 of the bowl 34 and circumferentially intermediately between the inlet port 70 and outlet port 72. In other embodiments, the vent 85 and/or another vent may be located at any other suitable location of the bowl 34, extending through the bowl body 42 to the bowl cavity 44.

As shown particularly in FIG. 3, a flow path 87 extends through the filter assembly 30 through the bowl 34 and between the inlet port 70 and outlet port 72. Particularly, the flow path extends from the inlet port 70, to the bowl cavity 44, through the interconnected filter element 32, adapter 33 and cover element 38, and then out the outlet port 72.

Turning now to FIGS. 6 to 10, the exemplary filter element 32, adapter 33 and cover element 38 are shown as an interconnected assembly 88, which is jointly removably received into the bowl 34 to define a portion of the flow path 87 through the filter assembly 30. For example, the cover element 38, the adapter 33, and the filter element 32, are linearly removably translated relative to the bowl 34, such as along the longitudinal bowl cavity axis 54, to insert and remove the interconnected assembly 88 from the bowl cavity 44.

In some embodiments, one or more of the filter element 32, the adapter 33 and the cover element 38 may be unitary in construction. For example the adapter 33 and the cover element may be unitary in construction. In another example, the adapter 33 may be integral with the filter element 32, rather than being separately coupled components. In other embodiments, the adapter 33 may be affixed to the cover element 38, such as permanently affixed, for example via welding, adhesives, etc. Likewise, the adapter 33 may be affixed to the filter element 32, such as permanently affixed, for example via welding, adhesives, etc.

The cover element 38 has a retaining feature at a proximal end 110 of the cover element 38. The retaining feature retains the filter element 32 relative to the cover element 38, such as during removal of the interconnected assembly 88 from the bowl 34. The retaining feature may connect directly or indirectly to the filter element 32.

For example, the depicted retaining feature includes threads 94 that threadedly connect to the adapter 33. In other embodiments, the retaining feature may be a snap feature, such as a key and groove feature.

The adapter 33 has an endpiece 90 that is configured to engage the cover element 38 and a coupling end 91 configured to couple to the filter element 32. An adapter passage 79 extends through the adapter 33 between the endpiece 90 and the coupling end 91 for fluidly connecting the filter element 32 with the outlet port 72 via the cover element 38.

The endpiece 90 of the depicted adapter 33 includes a coupling feature, such as threads 92, for coupling to a corresponding feature of the cover element 38, such as the threads 94. The endpiece 90 may include a groove 97 for retaining a sealing member, such as an o-ring 98, for sealing between the adapter 33 and the proximal end 110 of the cover element 38. In other embodiments, the coupling feature may be a snap feature.

The adapter 33 has coupling end 91 opposing the endpiece 90 for engaging a coupling end 93 of the filter element 32. The coupling ends 91 and 93 may have any suitable corresponding features to engage and latch with one another to interlock the adapter 33 and the filter element 32. One such example is shown and described in U.S. Patent Application Publication 2012/0181224 A1, assigned to Parker-Hannifin Corporation of Cleveland, Ohio.

For example, the filter element may include a sealing element, such as the gasket 95 depicted as engaged on the coupling end 93 of the filter element 32. The gasket 95 may be press fit into the coupling end 91 of the adapter 33. In this way, the filter element 32 may be retained relative to the cover element 38 during removal of the cover element 38 from the bowl 34. The gasket 95 may be integral with the coupling end 93 or may be separate. Further the adapter 33 and filter element 32 may have alignment features such as the one or more alignment keys 99 of the filter element 32 for being received into the one or more alignment slots 101 of the adapter 33.

In other embodiments, the adapter 33 may include a groove for receiving the gasket 95 and for retaining the filter element 32 relative to the cover element 38 during removal of the cover element 38 from the bowl 34. In still other embodiments, the adapter 33 may include a retaining key and the filter element 32 may include a corresponding retaining groove for receiving the retaining key to retain the filter element 32 relative to the cover element 38. In yet another embodiment, the filter element 32 may include the key and the adapter 33 may include the groove.

The depicted filter element 32 includes a suitable filter media material 96, such as an imperforate material, configured for allowing flow of fluid from the inlet port through the filter element 32 but also for preventing passage of contaminants, such as particulates, to the outlet port 72. Fluid passing through the filter media material 96 flows into a filter passage 86 of the filter element 32 towards the adapter passage 79. The filter passage 86 is interdisposed along the flow path 87 through the filter assembly 30 between the inlet port 70 and the outlet port 72, and more specifically along the flow path 87 between the inlet port 70 and the adapter passage 79 of the adapter 33.

Turning now to the cover element 38, this component extends along a longitudinal cover axis 102 between the proximal end 110 connected to the filter element 32 and a distal end 112 opposing the proximal end 110. The depicted proximal end 110 includes the threads 94. The distal end 112 includes a suitable removal aid, such as the depicted cover handle 114, for enabling easy insertion and removal of the cover element 38 into the bowl cavity 44. In some embodiments the removal aid may be a depression, such as a slot, for receiving a tool. Further, when the depicted cover element 38 is assembled in the depicted bowl 34, the longitudinal bowl axis 54 and the longitudinal cover axis 102 are aligned coaxially.

Between the proximal end 110 and the distal end 112, the cover element 38 is generally cylindrically shaped to enable it to be received into the generally cylindrical bowl cavity 44. In other embodiments, the cover element 38 may be otherwise suitably shaped.

A cover pin cavity 120 extends into an intermediate portion of the cover element 38 disposed along the cover axis 102 between the proximal end 110 and the distal end 112. The cover pin cavity 120 is configured, such as being sized, to receive the securing pin 40. The cover pin cavity 120 is also correspondingly aligned along a length of the cover element 38 between the proximal and distal ends 110 and 112 to be aligned with the bowl pin hole 55 along the pin hole axis 60.

As shown, the cover pin cavity 120 is a through-hole extending fully through the cover element 38. Though in other embodiments, the cover pin cavity 120 may only extend partially through the cover element 38. Further, the cover pin cavity 120 may be any suitable shape, such as to allow for easy receipt and removal of the securing pin 40 relative to the cover element 38.

Disposed along the cover axis 102 between the cover pin cavity 120 and the distal end 112 is a shoulder, such as the annular shoulder 124, for engaging the shoulder seat 62 of the bowl 34. In other embodiments, the shoulder 124 may be any suitable projection extending radially outwardly from a remainder of the cover element for engaging the shoulder seat 62 of the bowl 34.

A first seal element 132 (FIG. 7), for example an annular seal such as a suitable o-ring, is disposed, such as removably disposed, between the bowl 34 and the cover element 38 to seal the flow path inside the bowl cavity 44 from an environment external to the filter assembly 30. The first seal element 132 is retained about the cover element 38 to enable easy removal, maintenance and replacement of the first seal element 132 as necessary. Though in other embodiments, the first seal element 132 may be retained with the bowl 34 upon translation of the cover element 38 relative to the bowl cavity 44 along the bowl axis 54.

Accordingly, as shown, the first seal element 132 circumscribes the cover element 38 and the cover axis 102, and thus also the longitudinal bowl cavity axis 54 when the cover element 38 is engaged with the bowl 34 in the bowl cavity 44. The first seal element 132 is located along a length of the cover element 38 between the cover pin cavity 120 and the proximal end 110, such as between the shoulder 124 and the proximal end 110. The location of the first seal element 132 separates the securing pin 40 from flow through the filter assembly 30. In this manner, the filter assembly 30 does not require additional seal elements disposed about the securing pin 40 to prevent leakage of fluid from the bowl cavity 44.

The first seal element 132 may be made of any suitable material, such as a material that is inert relative to the fluid flowing through the filter assembly 30. For example, the first seal element 132 may be made of a polymer that is inert relative to crude or refined oil or gas where the filter assembly 30 is used for oil or gas filtering.

A lower portion 134 of the cover element 38 disposed adjacent the proximal end 110 is sized, such as diametrically, to engage the inner surface of the bowl 34 defining the bowl cavity 44. Disposed along the length of the cover element 38 between the first seal element 132 and the proximal end 110 are an inlet feature 140 for mating with the inlet port 70 of the bowl 34, an outlet feature 142 for mating with the outlet port 72 of the bowl 34, and a cover passage 100 extending along the flow path between a cover inlet 144 of the cover element 38 and the outlet feature 142.

Each of the inlet port 70, outlet port 72, cover inlet 144 and cover passage 100 define part of the flow path 87 (FIG. 3) through the filter assembly 30. Accordingly, flow along the flow path 87 through the filter assembly 30 generally moves from the inlet port 70, to the inlet feature 140 and bowl cavity 44, through the filter media 96, to the filter passage 86, to the cover passage 100 via the cover inlet 144, to the outlet feature 142, and then out the filter assembly 30 via the outlet port 72.

The inlet feature 140, such as an inlet groove, is alignable with the inlet port 70 via rotation of the cover element 38. The inlet feature 140 is a part of the lower portion 134 of the cover element 34 that is not engaged with the inner surface of the bowl 34 to allow for fluid moving through the inlet port 70 of the bowl to move about the cover element 38 and into the bowl cavity 44. As shown, the inlet feature 140 is a reduced diameter portion of the cover element 38, such as a groove in an external surface of the cover element 38 extending to the proximal end 110. In other embodiments the inlet feature 140 may be any suitable groove or passage in the cover element 38 enabling fluid to move about the cover element 38 and into the bowl cavity 44.

The inlet feature 140 is not fluidly connected with the cover passage 100 within the cover element 38. In this way fluid entering the bowl cavity 44 must first move through the filter element 32 to be filtered and may not simply bypass the filter element 32.

After fluid has moved through the inlet port 70 and past the inlet feature 140, it enters a portion of the bowl cavity 44 disposed about the cover element 38 towards the filter element 32. After moving through the filter element 32, the fluid enters the cover passage 100 via the cover inlet 144.

The cover passage 100 extends through the cover element 38 along the flow path 87 between the cover inlet 144 and the outlet feature 142. The cover inlet 144 is disposed along the flow path 87 between the filter passage 86 of the filter element 32 and the cover passage 100. The depicted cover inlet 144 includes a retaining feature for retaining the filter element 32 relative to the cover element 38. The depicted retaining feature includes the threads 94 of the cover element 38.

The outlet feature 142, such as an outlet port of the cover element 38, is alignable with the outlet port 72 of the body 34, such as via alignment of the corresponding alignment members of the cover element 38 and the body 34. The outlet feature 142 may be a port having a diameter equal to, larger, or smaller than the outlet port 72.

The depicted outlet feature 142 and inlet feature 140 are diametrically opposed about cover element 38, to be alignable with the diametrically opposed inlet and outlet ports 70 and 72 of the bowl 34. In an embodiment where the inlet and outlet ports 70 and 72 are not diametrically opposed, the inlet and outlet features 140 and 142 may be correspondingly spaced about the cover element 38 to align with the inlet and outlet ports 70 and 72.

Figure 7:
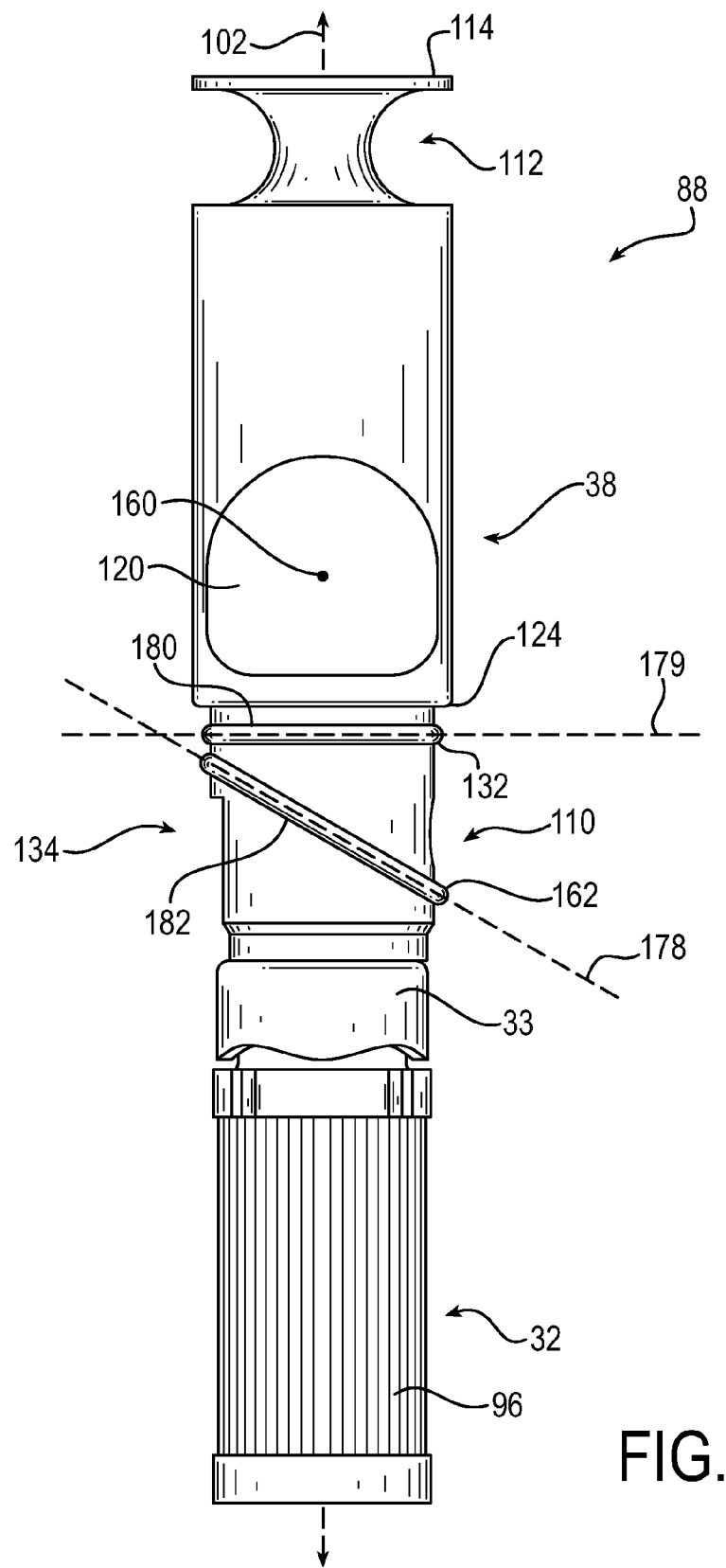
FIG. 7 is a side view of the cover element, adapter and filter element of FIG. 6.
Figure 8:
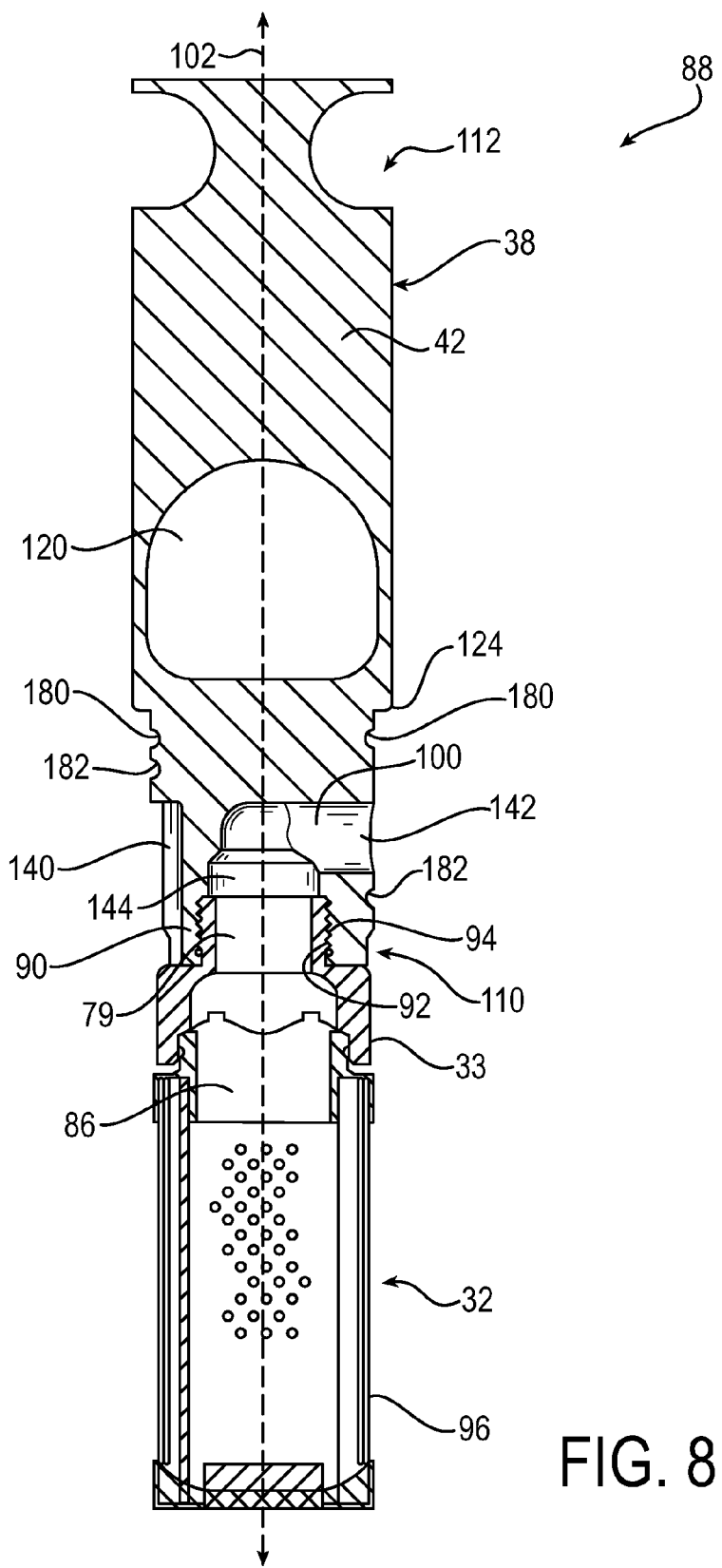
FIG. 8 is a cross-section side view of the cover element, adapter and filter element of FIG. 6.
Figure 9:
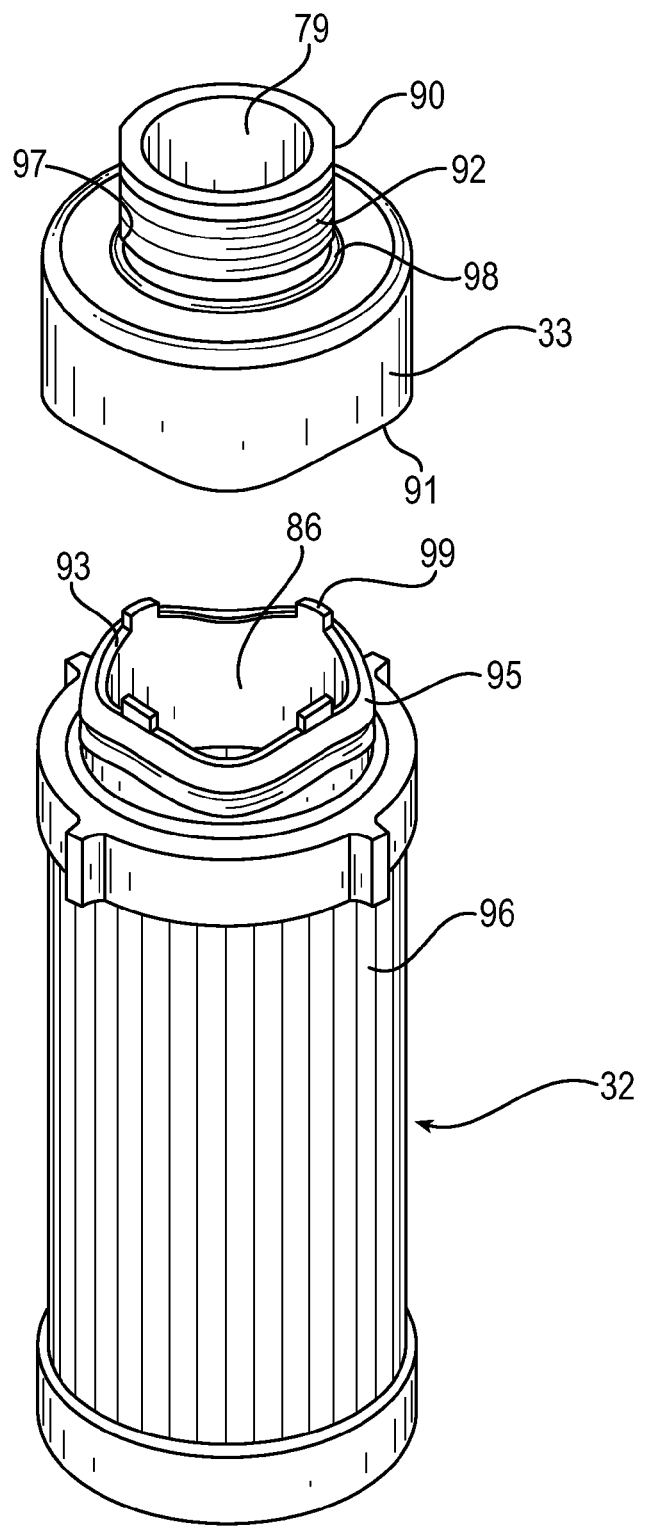
FIG. 9 is an orthogonal view of the adapter and filter element of FIG. 6.
Figure 10:
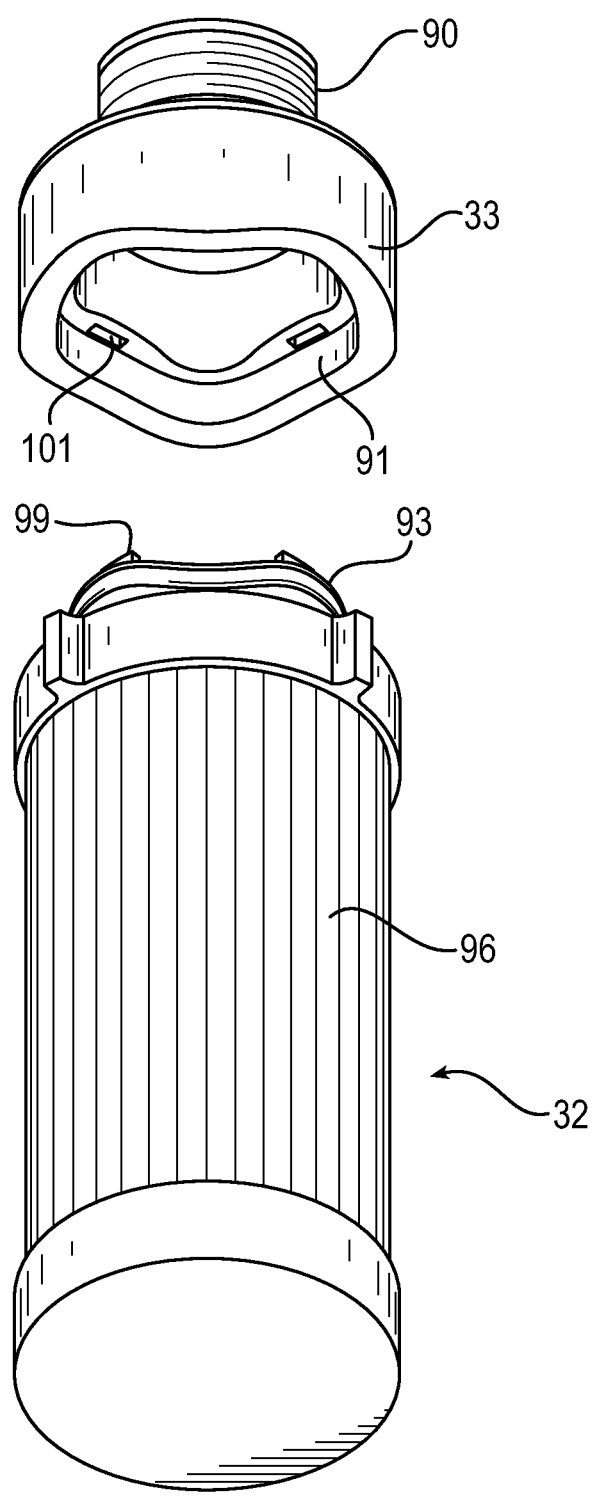
FIG. 10 is another orthogonal view of the adapter and filter element of FIG. 6.

Within the bowl cavity 44, fluid is prevented from flowing directly from the inlet port 70 to the outlet port 72 and bypassing the filter element 32 via a second seal element 162 (FIG. 7). The second seal element 162, for example an annular seal such as a suitable o-ring, is disposed, such as removably disposed, between the bowl 34 and the cover element 38 to fluidly separate the inlet port 70 and the outlet port 72 from one another. In this way, the inlet port 70 and the outlet port 72 are separated from one another external to the cover element 38 and within the bowl cavity 44 via the second seal element 162. On the other hand, the ports 70 and 72 are in fluid communication in the bowl cavity 44 of the filter assembly 30 via the filter passage 86 extending through the filter element 32 and the cover passage 100 extending through the cover element 38.

The second seal element 162 circumscribes the cover element 38 and the cover axis 102, and thus also the longitudinal bowl cavity axis 54, when the cover element 38 is engaged with the bowl 34 in the bowl cavity 44. The second seal element 162 is retained about the cover element 38 to enable easy removal, maintenance and replacement of the second seal element 162 as necessary. Though in other embodiments, the second seal element 162 may be retained with the bowl 34 upon translation of the cover element 38 along the bowl axis 54 relative to the bowl cavity 44.

The second seal element 162 is located along a length of the cover element 38 between the cover pin cavity 120 and the proximal end 110, and more particularly along the cover axis 102 between the first seal element 132 and the proximal end 110. In its circumscription about the cover element 38, a portion of the second seal element 162 is disposed along an external length of the cover element 38 between the inlet feature 170 and the first seal element 132, while an opposing portion of the second seal element 162 is disposed along an external length of the cover element 38 between the outlet feature 172 and the proximal end 110.

It will be appreciated that in other embodiments the second seal element 162 may be oppositely aligned about the cover element 38. In such case, a portion of the second seal element 162 may be disposed along an external length of the cover element 38 between the outlet feature 172 and the first seal element 132. An opposing portion of the second seal element 162 may be disposed along an external length of the cover element 38 between the inlet feature 170 and the proximal end 110 of the cover element 38.

With respect to the depicted alignment of the second seal element 162, when the cover element 38 is inserted into the bowl 34, the second seal element 162 is disposed between the bowl 34 and the cover element 32 and separates the portion of the bowl cavity 44 disposed about the cover element 38 into inlet and outlet portions, or sub-portions, corresponding to the respective inlet and outlet ports 70 and 72. In other words, the inlet and outlet portions of the bowl cavity 44 are separated from one another via the second seal element 162. Thus, when the cover element 38 is received in the bowl cavity 44, the inlet and outlet ports 70 and 72 of the bowl 34 are separated from one another in the bowl cavity 44 by the second seal element 162.

More particularly, the second seal element 162 includes a central plane 178 (FIGS. 6 and 7) that separates the second seal element 162 into two halves, such as complete annular halves. The central plane 178 is set at an oblique angle to the longitudinal cover axis 102. Thus the central plane 170 of the second seal element 162 is not set parallel to a corresponding central plane 179 of the first seal element 132.

Additionally, as with the first seal element 132, the second seal element 162 may be made of any suitable material, such as a material that is inert relative to the fluid flowing through the filter assembly 30.

The cover element 38 also includes a first groove, such as an annular first groove 180, circumscribing the cover element 38 and disposed along the length of the cover element 38 between the cover pin cavity 120 and the proximal end 110. The annular first groove 180 is configured, such as being shaped, to engage the first seal element 132. The annular first seal element 132 is retained about the cover element 38 during translation of the cover element 38 relative to the bowl 34 via the first groove 180.

A second groove, such as an annular second groove 182, circumscribes the cover element 38 and is disposed along a length of the cover element 38 between the first groove 180 and the proximal end 110. The second groove 182 is configured, such as being shaped, to engage the second seal element 162. The second seal element 162 is retained about the cover element 38 during translation of the cover element 38 relative to the bowl 34 via the second groove 182.

Similar to the disposition of the first seal element 132 and the second seal element 162 relative to one another, the first groove 180 and the second groove 182 each include central planes that are not disposed parallel to one another. It will be appreciated that the first seal element 132 and the first groove 180 may alternatively be disposed along the length of the cover element 38 between the pin cavity 120 and the shoulder 124. Further, while the depicted cover element 38 includes the annular first groove 180 for at least partially retaining the first seal element 132 relative to the cover element 38, and the second groove 182 for at least partially retaining the second seal element 162 relative to the cover element 38, in other embodiments one or both of the first groove 180 and the second groove 182 may be omitted. In such case, the first seal element 132 and/or the second seal element 162 may be disposed about the cover element 38 via other suitable means.

Referring again to the cover element 38, one or both of the cover element 38 and the bowl 34 may include a suitable alignment feature to align the cover element 38 relative to the bowl 34, such as upon insertion of the cover element 38 into the bowl cavity 44. Thus, the suitable alignment feature(s) enables alignment of the inlet feature 140 with the inlet port 70, the outlet feature 142 with the outlet port 72, and also the cover pin cavity 120 with the bowl pin hole 55.

The alignment feature may also serve to prevent rotation of the cover element 38 relative to the bowl cavity 44 after insertion of the cover element 38, to maintain a continuous flow path through the filter assembly 30 during use. In other embodiments, a separate anti-rotation feature may be provided on one or more of the cover element 38 and the bowl 34 to prevent rotation of the cover element 38 relative to the bowl 34.

For example, one of the cover element 38 and the bowl body 42 may include a channel and the other of the cover element 38 and the bowl body 42 may include a key. The key may be received in and translate in the channel to align the features of the cover element 38 with the corresponding features of the bowl 34 as mentioned, and/or to prevent rotation of the cover element 38 relative to the bowl 34. Alternatively or additionally, any other suitable alignment features may be included.

Figure 11:
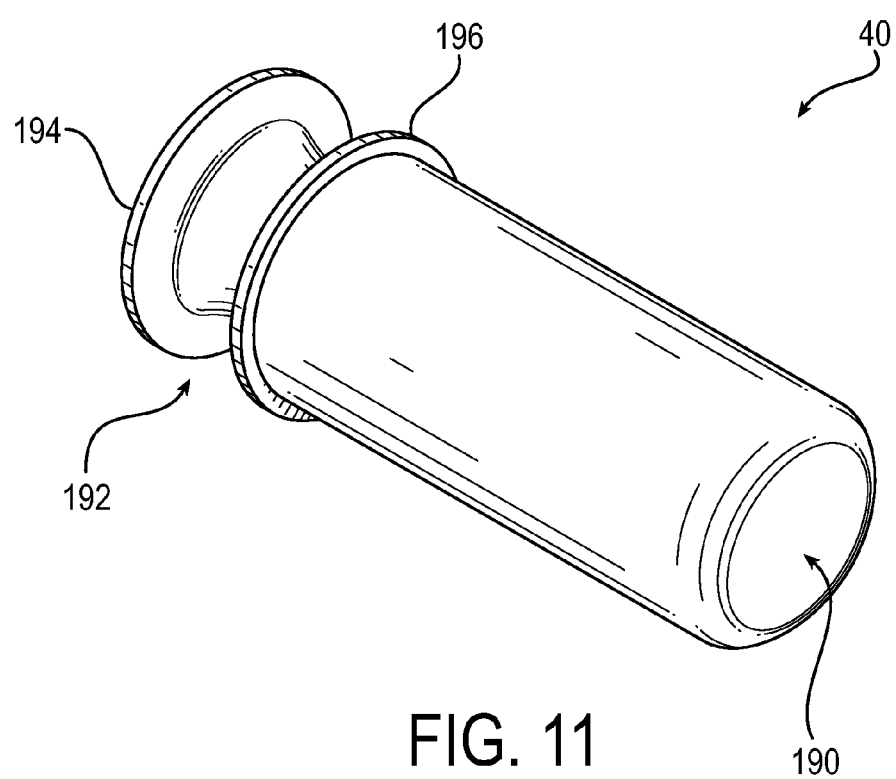
FIG. 11 is an orthogonal view of the securing pin of FIG. 1.

Turning now to FIG. 11, the securing pin 40 is shown separate from the remainder of the filter assembly 30. The securing pin 40 extends between a first end 190 and a second end 192. The first end 190 is received into the bowl 34 and into the bowl cavity 44. The second end 192 includes a suitable removal aid, such as the depicted pin handle 194, for enabling easy insertion and removal of the securing pin 40 relative to the bowl 34 and/or the cover element 38. In some embodiments the removal aid may be a depression, such as a slot, for receiving a tool.

Along a length of the securing pin 40 between the first and second ends 190 and 192, the securing pin 40 is configured, such as shaped, to be translated, such as linearly translated, along the pin hole axis 60 through the bowl pin hole 55 and into the cover pin cavity 120, when the bowl pin hole 55 and the cover pin cavity 120 are aligned along the pin hole axis 60. For example, the depicted securing pin 40 is generally cylindrical in shape. A protrusion 196 extends radially outwardly from the pin 40 to control depth of translation of the pin 40 through the bowl 34 and cover element 38. The protrusion 196 may have any suitable shape, such as the depicted annular ring.

Though not depicted, at least one of the securing pin 40, bowl 34, and cover element 38 may include a suitable retaining feature to prevent one or both of the securing pin 40 and cover element 38 from moving relative to the bowl 34, such as in response to vibration or in situations where the filter assembly 30 is depressurized or subject to relatively low pressure. The retaining feature may include a locking pin and slot, cotter pin, nut, etc.

For example, the securing pin 40 may extend fully through each of the cover element 38 and bowl 34, such that the pin handle 194 may extend from one side of the bowl 34 while the first end extends at least partially from an opposing side of the bowl. The first side 190 may include a pin hole extending therethrough, such as orthogonally to a longitudinal axis of the securing pin 40, and a locking pin, such as a cotter pin, may be inserted into the pin hole for retaining the securing pin 40 in the bowl 34. In another example, the first side 19 may be externally threaded, such as to threadedly receive a nut for preventing removal of the securing pin 40 from the bowl 34.

The securing pin 40, bowl 34, adapter 33 and cover element 38 may each be composed of the same material or one or more of the securing pin 40, bowl 34, adapter 33 and cover element 38 may be composed of different materials relative to one another. The materials are preferably inert relative to fluid being filtered in the filter assembly 30. For example, stainless steel or aluminum may be used.

Further the filter assembly 30 may include an indicating portion, such as a differential pressure indicating portion, for sensing the differential pressure across the filter assembly 30, such as between the inlet port 70 and the outlet port 72. The indicating portion may be included in any suitable part of the filter assembly 30, such as in the bowl body 42 or cover element 38. The indicating portion may have a visual display or my communicatively couple, such as via wires or wirelessly, to a visual display and/or recording device integral with or separate from the filter assembly 30.

In summary, and again referring to the flow path 87 shown in FIG. 3, the filter assembly 30 includes a threadless closure system for sealing a filter element 32 of the filter assembly 30 within a bowl 34 of the filter assembly 30. The bowl 34 is fluidly connectable to opposing fluid transfer passages. The filter element 32 and a cover element 38 connected to the filter element 32 are received into the bowl 34. The filter element 32 is retained in the bowl 34 via a pin 40 of the filter assembly 30 that engages the cover element 38. The filter element 32 may be removed and replaced without the unscrewing of threads exposed to an external environment external to the filter assembly 30 during typical use of the filter assembly 30.

When the filter assembly 30 is in use in line between opposed fluid transfer passages, unfiltered fluid moves through the filter assembly 30, along the flow path 87 of the filter assembly 30 where it is filtered, such that filtered fluid exits the filter assembly 30. More particularly, unfiltered fluid enters the inlet port 70 of the bowl 34, passes the inlet feature 140 of the cover element 38, and moves into the bowl cavity 44. Next, the unfiltered fluid moves through the imperforate filter media 96 of the filter element 32 and into the filter passage 86. The filtered fluid moves through the adapter passage 79 of the adapter 33, through the cover passage 100 between the cover inlet 144 and outlet feature 142, and then exits the bowl cavity 44 and the filter assembly 30 via the outlet port 72 of the bowl 34.

It will be appreciated that in other embodiments, unfiltered fluid may instead move from the filter passage 86 through the filter element 32 to the bowl cavity 44, rather than the reverse. Such an embodiment may include the second seal element 132 oppositely aligned as previously discussed, or additionally or alternatively where unfiltered fluid moves in a direction from the outlet port 72 to the inlet port 70.

The invention also includes a method of replacing a filter element of an exemplary filter assembly, such as for replacing the filter element 32 of the filter assembly 30 shown in FIGS. 1 and 2. In the case of the filter assembly 30, the filter assembly 30 must first be depressurized, as the securing pin 40 and cover element 38 are at least partially retained relative to one another via pressure of fluid moving through the filter assembly 30. For example, the vent plug sealing the vent hole 85 may be at least partially opened to bleed pressure and/or fluid from the bowl cavity 44 once the inlet port 70 and outlet port 72 are fluidly separated from pressure in the associated fluid transfer passages.

The securing pin 40 is then disengaged, such as linearly removed, from the cover element 38, and more particularly from the cover pin cavity 120. The securing pin 40 could also be additionally removed from the bowl pin hole 55, but must at least be translated along the pin hole axis 60 to clear the cover element 38 such that the cover element 38 may be removed from the bowl 34. The pin handle 194 may be grasped to remove the securing pin 40. In the case where a suitable retaining feature is included to retain the securing pin 40 relative to the bowl 34, the retaining feature may first be released or disengaged prior to removing the securing pin 40.

Next, the cover element 38 is removed, such as linearly removed from the bowl 34, and more particularly from the bowl cavity 44. The cover element 38 is translated along the bowl cavity axis 54 to achieve its removal. The cover handle 114 may be grasped to remove the cover element 38. Because the cover element 38 is interconnected with the filter element 32, and also with the adapter 33, removal of the cover element 38 also causes the filter element 32 to be removed from the bowl cavity 44.

The filter element 32 may then be disconnected from the cover element 38, such as by uncoupling the filter element 32 from the adapter 33 or via unscrewing the adapter 33 from the cover element 38 and then uncoupling the filter element 32 from the adapter 33. In another embodiment where the filter element 32 includes the endpiece 90 and the adapter 33 is omitted, the filter element 32 may be unscrewed from the cover element 32. A new filter element 32 may then be connected to the cover element 38 in a reverse manner.

Next, the cover element 38 may be re-inserted into the bowl cavity 44 along the bowl cavity axis 54, with the inlet port 70 aligned with the inlet feature 140, the outlet port 72 aligned with the outlet feature 142, and the cover pin cavity 120 aligned with the bowl pin hole 55. For example, a suitable alignment feature of the bowl 34 may be aligned with a suitable corresponding alignment feature of the cover element 38.

Subsequently, the securing pin 40 may be re-engaged with the cover pin cavity 120 through the bowl pin hole 55 via translation along the pin hole axis 60. In the case where a suitable retaining feature is included to retain the securing pin 40 relative to the bowl 34, the retaining feature may next be reengaged prior to removing the securing pin 40. Accordingly, the filter element 32 may be removed and replaced without the unscrewing of threads that are exposed to an external environment external to the filter assembly 30 during use of the filter assembly 30, such as threads that are not fully sealed in the bowl cavity 44 during typical use of the filter assembly 30.

Figure 12:
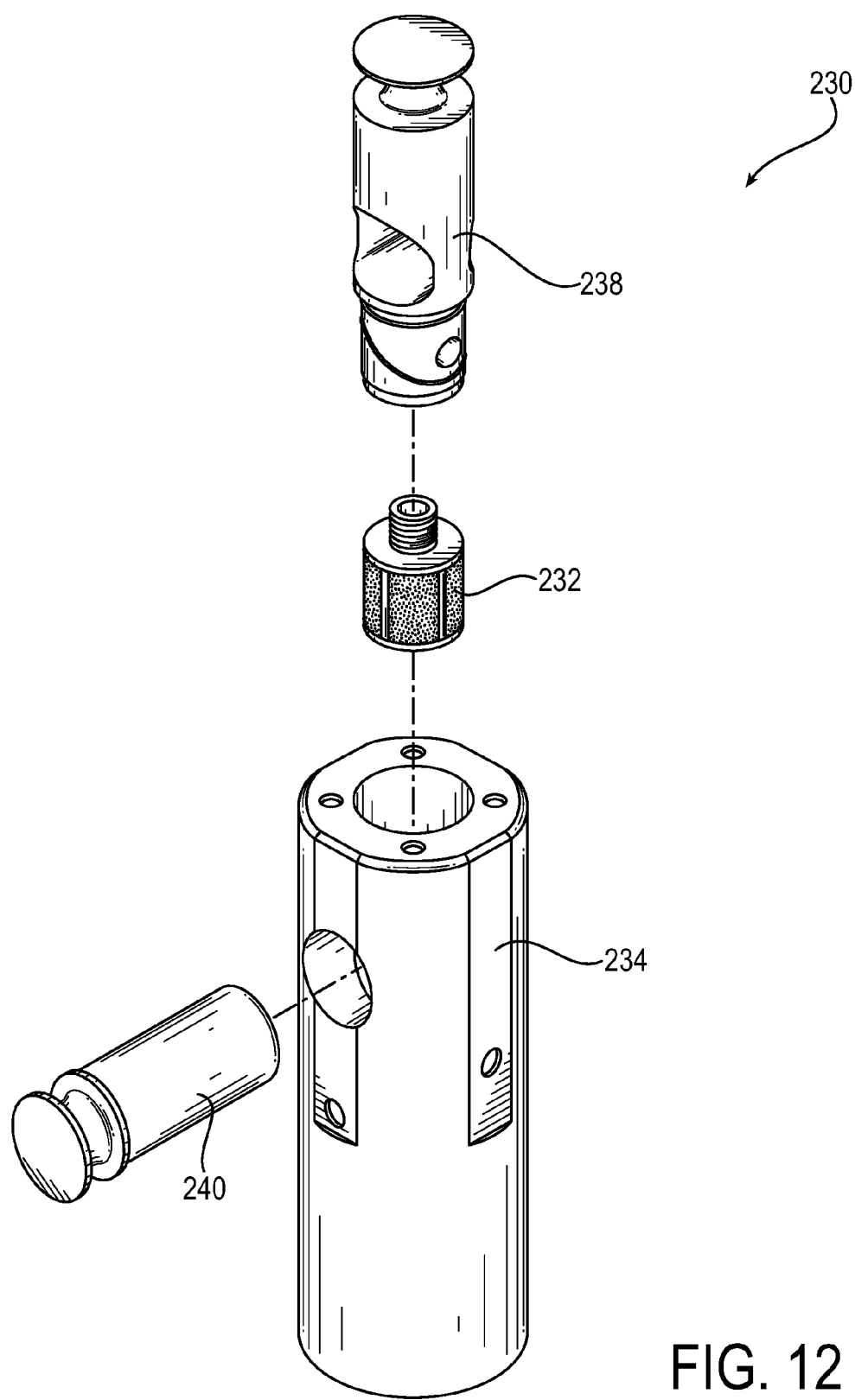
FIG. 12 is an exploded orthogonal view of another exemplary filter assembly.
Figure 13:
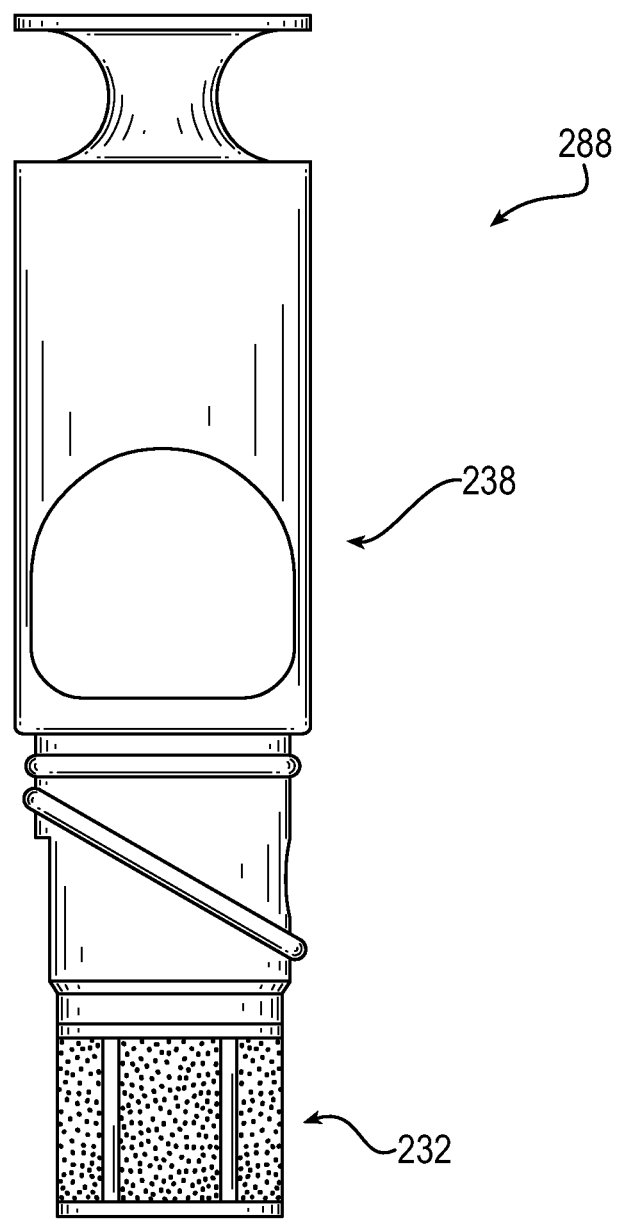
FIG. 13 is a side view of the cover element and filter element of the exemplary filter assembly of FIG. 12.
Figure 14:
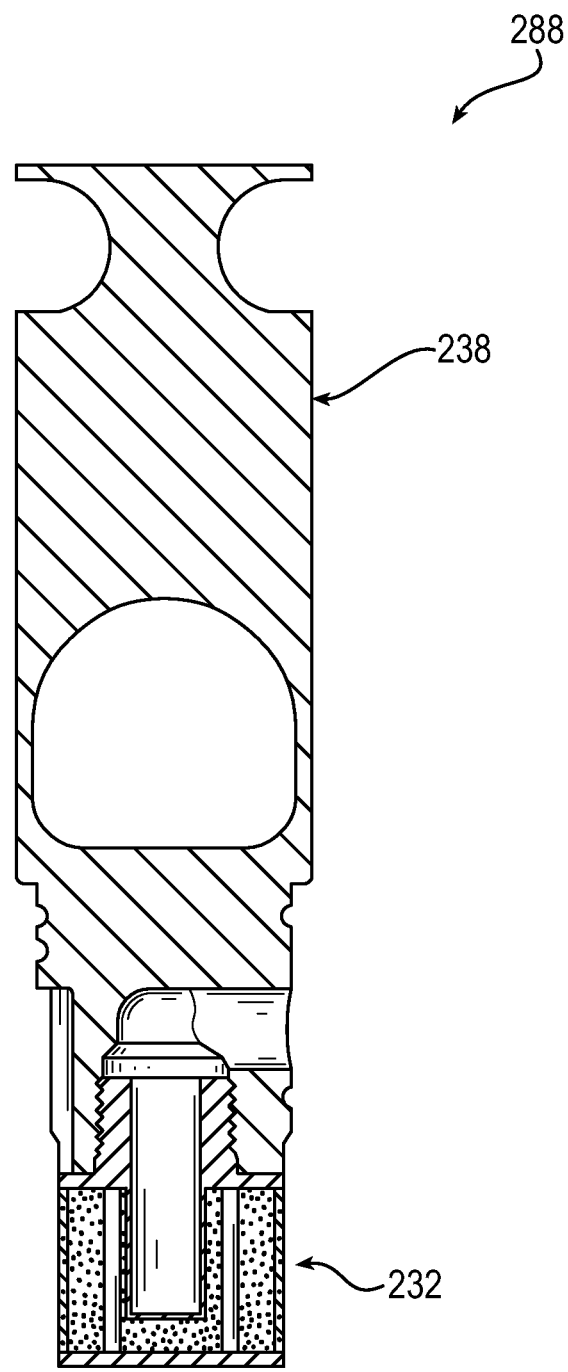
FIG. 14 is a cross-section side view of the cover element and filter element of FIG. 12.

Turning now to FIGS. 12 to 14, an exemplary embodiment of another exemplary filter assembly is shown at 230. The filter assembly 230 is substantially the same as the above-referenced filter assembly 30, and consequently the same reference numerals but indexed by 200 are used to denote structures corresponding to similar structures in the filter assembly 230. The foregoing description of the filter assembly 30 is equally applicable to the filter assembly 230 except as noted below. Moreover, it will be appreciated upon reading and understanding the specification that aspects of the filter assemblies 30 and 230 may be substituted for one another or used in conjunction with one another where applicable.

The filter assembly 230 is shown including a bowl 234, a securing pin 240, an exemplary filter element 232 and a cover element 238. No adapter is included and is omitted. The interconnected assembly 288 is jointly removably received into the bowl 234 to define a portion of a flow path through the filter assembly 230. The filter assembly 232 includes an endpiece 90 for coupling, such as threaded coupling, with the cover element 238. To remove the depicted filter element 232 relative to the cover element 238, the filter element 232 is unthreaded from the cover element 232 after the interconnected assembly 288 has been removed from the bowl 234. It will be appreciated that the interconnected assembly 288 of the filter element 232 and cover element 238 may be used in the filter assembly 30 or with the bowl 34 and securing pin 40.

Figure 15:
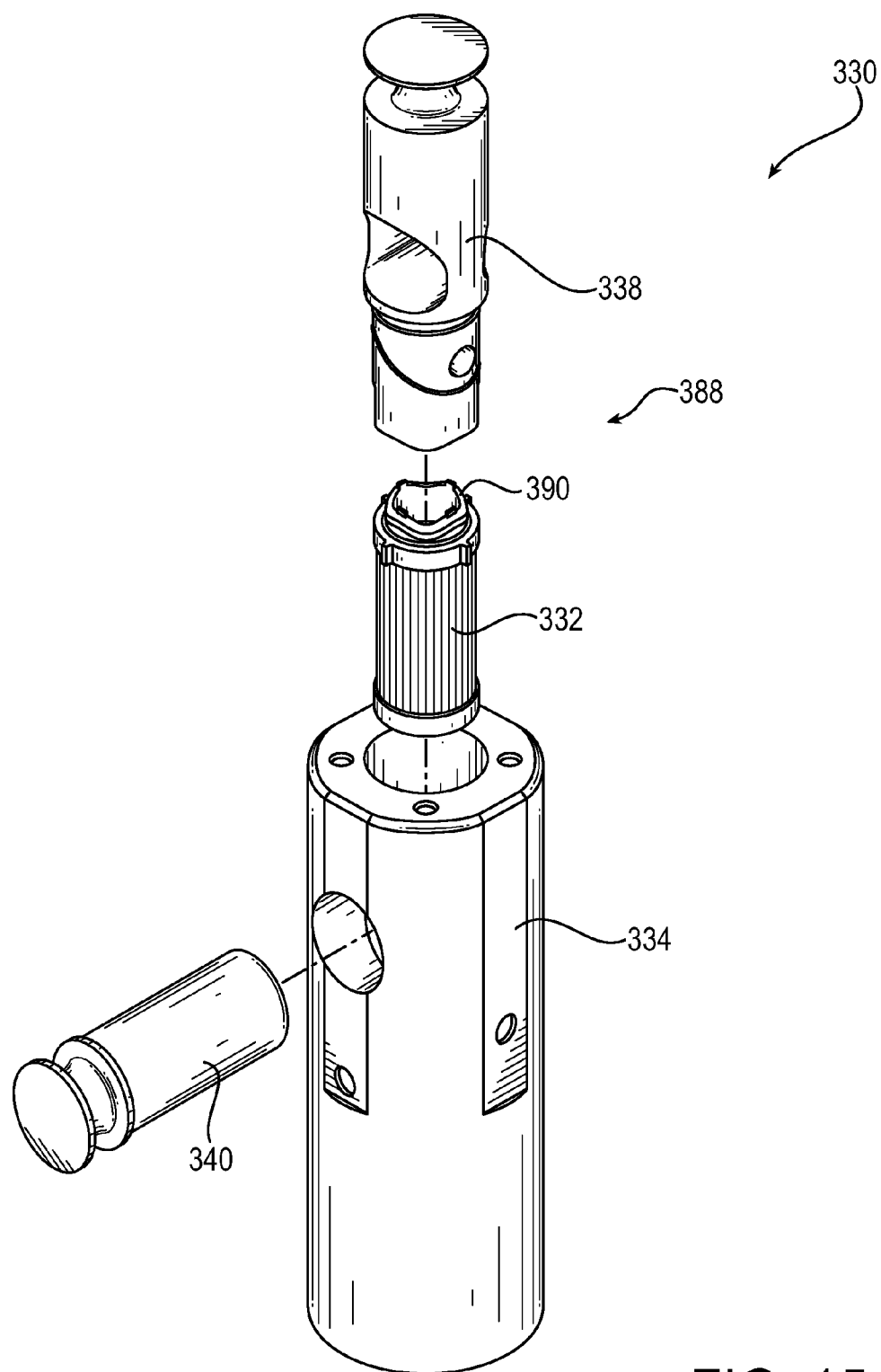
FIG. 15 is an exploded orthogonal view of yet another exemplary filter assembly.

Turning next to FIG. 15, another exemplary embodiment of another exemplary filter assembly is shown at 330. The filter assembly 330 is substantially the same as the above-referenced filter assemblies 30 and 230, and consequently the same reference numerals but indexed, by 300 in relation to FIG. 1, are used to denote structures corresponding to similar structures in the filter assembly 330. The foregoing description of the filter assemblies 30 and 230 are equally applicable to the filter assembly 230 except as noted below. Moreover, it will be appreciated upon reading and understanding the specification that aspects of the filter assemblies 30, 230 and 330 may be substituted for one another or used in conjunction with one another where applicable.

The filter assembly 330 is shown including a bowl 334, a securing pin 340, an exemplary filter element 332 and a cover element 338. No adapter is included and is omitted. The interconnected assembly 388 of the cover element 338 and filter element 332 is jointly removably received into the bowl 334 to define a portion of a flow path through the filter assembly 330. The filter assembly 332 includes a coupling end 390 for coupling, such as via a snap fit or via a groove and key fit with the cover element 338. In this way, the filter assembly 332 may be retained relative to the cover element 338 upon removal of the cover element 338 from the bowl 334. It will be appreciated that the interconnected assembly 388 of the filter element 332 and cover element 338 may be used in the filter assembly 30 or the filter assembly 230.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter assembly for fluid connection to opposed fluid transfer passages, the filter assembly comprising:
   a bowl configured for fluid connection with the opposed fluid transfer passages and having a flow path defined therein for flow of fluid through the filter assembly between the opposed fluid transfer passages;
   a filter element;
   a cover element having a portion thereof inserted into the bowl and connected to the filter element, the cover element and filter element being jointly removably received in the bowl to further define a portion of the flow path;
   a pin removably inserted into the bowl and into the portion of the cover element inserted into the bowl to secure the cover element in the bowl, the pin being separated from flow through the filter assembly along the flow path within the bowl;
   wherein the bowl includes an inlet port fluidly connectable to one of the opposed fluid transfer passages and an outlet port fluidly connectable to the other of the opposed fluid transfer passages, and further including a seal element that circumscribes the cover element and is disposed between the bowl and the cover element, and that within the bowl fluidly separates the inlet port from the outlet port, preventing fluid communication within the bowl between the inlet port and outlet port.

2. The filter assembly of claim 1, wherein the flow path through the filter assembly is defined between the inlet port and the outlet port of the bowl, and includes a cover passage extending through the cover element and a filter passage through the filter element disposed therebetween, the filter passage being disposed between the inlet port and the cover passage along the flow path.

3. The filter assembly of claim 1, further including another seal element disposed between the bowl and the cover element that separates the pin from the flow path through the filter assembly.

4. The filter assembly of claim 1, wherein the seal element includes a central plane that separates the seal element into two complete annular halves, the central plane set at an oblique angle to a longitudinal axis extending through the cover element, wherein the cover element is movable along the longitudinal axis to be received into and removed from the bowl.

5. The filter assembly of claim 1, wherein the pin has a central longitudinal pin axis and the cover element has a central longitudinal cover axis, wherein the pin axis and the cover axis orthogonally intersect one another.

6. The filter assembly of claim 1, wherein the pin includes a pin handle at an end opposing another end of the pin that is received into the bowl.

7. The filter assembly of claim 1, wherein the filter element includes a retaining gasket received into and retained by the retaining end of the cover element such that the cover element and filter element are jointly translatable relative to the bowl.

8. The filter assembly of claim 1, further including an adapter coupled between the filter and the cover element.

9. The filter assembly of claim 8, wherein the filter includes a retaining gasket received into and retained by the adapter such that the cover element, adapter and filter element are jointly translatable relative to the bowl.

10. A method of replacing a filter element in a filter assembly having a bowl attached between opposing fluid transfer passages, a filter element and a cover element received into the bowl, and a pin inserted into the bowl and engaging the cover element to preclude rotation of the cover element relative to the bowl and withdrawal of the cover element and filter element from the bowl, the method including the steps of:
  withdrawing the pin from a pin cavity of the cover element sufficiently to allow the previously rotatably fixed cover element to be rotatable relative to the bowl and withdrawn from the bowl along a longitudinal axis of the bowl, the pin being withdrawn along a pin axis transverse to the longitudinal bowl axis;
  withdrawing the cover element from the bowl; and
  disconnecting the filter element from the cover element.

11. The method of claim 10, further including the steps of aligning an alignment portion of the cover element with a corresponding alignment portion of the bowl prior to re-inserting the cover element into the bowl, and then re-inserting the cover element into the bowl.

12. The method of claim 11, further including the step of re-engaging the pin with the cover element after re-inserting the cover element into the bowl.

13. The method of claim 10, wherein the withdrawing the cover element form the bowl is effectable while the pin remains at least partially engaged with the bowl.

14. A filter assembly comprising:
  a bowl having a bowl body that defines a bowl cavity, the bowl cavity extending along a longitudinal cavity axis, and the bowl further having an inlet port and an outlet port extending through the bowl body into the bowl cavity;
  a cover element having a retaining feature at a retaining end for retaining a filter element therewith, the cover element being received into the bowl cavity along the longitudinal cavity axis, and having a cover passage extending through the cover element to an outlet portion of the cover element;
  a pin that extends transversely to the longitudinal cavity axis and engages a transversely extending cover pin cavity in the cover element and a bowl pin hole of the bowl to preclude axial withdrawal of the cover element form the bowl along the longitudinal cavity axis; and
  a seal element circumscribing the cover element, wherein one of an inlet portion or the outlet portion of the cover element is separated at an exterior of the cover element within the bowl cavity from the retaining end of the cover element by the seal element.

15. The filter assembly of claim 14, wherein the seal element is a resilient member disposed about the cover element and retained in a groove of the cover element.

16. The filter assembly of claim 14, wherein the seal element circumscribes the cover element and includes a central plane that is set at an oblique angle to the longitudinal cavity axis.

17. The filter assembly of claim 14, further including another seal element disposed between the bowl and the cover element that separates the pin from a flow path through the filter assembly.

18. The filter assembly of claim 14, wherein the inlet and outlet ports of the bowl are separated from one another external to the cover element within the bowl cavity by the seal element.

19. A filter assembly comprising:
  a bowl having a bowl body that defines a bowl cavity, the bowl cavity extending along a longitudinal cavity axis, and the bowl further having an inlet port and an outlet port extending through the bowl body into the bowl cavity;
  a cover element having a retaining feature at a retaining end for retaining a filter element therewith, the cover element being received into the bowl cavity along the longitudinal cavity axis, and having a cover passage extending through the cover element to an outlet portion of the cover element;
  a pin that extends transversely to the longitudinal cavity axis and engages a transversely extending cover pin cavity in the cover element and a bowl pin hole of the bowl to preclude axial withdrawal of the cover element form the bowl along the longitudinal cavity axis; and
  a seal element disposed about the cover element when the cover element is received in the bowl cavity, wherein one of an inlet portion or the outlet portion of the cover element is separated from the retaining end of the cover element in the bowl cavity and the inlet and outlet ports of the bowl are separated from one another in the bowl cavity by the seal element when the cover element is received into the bowl,
  wherein the seal element circumscribes the cover element and includes a central plane that is set at an oblique angle to the longitudinal cavity axis.

* * * * *